United States Patent
Watanabe (10) Patent No.: US 6,922,836 B2
(45) Date of Patent: Jul. 26, 2005

(54) DISK DRIVE APPARATUS

(75) Inventor: Takashi Watanabe, Ichikawa (JP)

(73) Assignee: TEAC Corporation, Tokyo (JP)

( * ) Notice: Subject to any disclaimer, the term of this patent is extended or adjusted under 35 U.S.C. 154(b) by 130 days.

(21) Appl. No.: 10/461,541

(22) Filed: Jun. 12, 2003

(65) Prior Publication Data

US 2004/0032811 A1 Feb. 19, 2004

(30) Foreign Application Priority Data

Jun. 12, 2002 (JP) ........................................ 2002-171604

(51) Int. Cl.$^7$ ............................................... G11B 33/02
(52) U.S. Cl. ..................................................... 720/601
(58) Field of Search .................... 369/75.21, 75.11, 369/77.11, 77.21; 720/601, 613, 650, 655, 664, 689; 360/97.01

(56) References Cited

U.S. PATENT DOCUMENTS

| 6,111,837 | A | * | 8/2000 | Watanabe et al. | ........... 720/601 |
| 6,151,284 | A | * | 11/2000 | Watanabe et al. | ........... 720/601 |
| 6,400,669 | B1 | * | 6/2002 | Lee | ............................. 720/664 |
| 6,452,887 | B2 | * | 9/2002 | Nakayama et al. | ......... 720/664 |

* cited by examiner

*Primary Examiner*—Angel Castro
(74) *Attorney, Agent, or Firm*—Anderson Kill & Olick P.C.; Eugene Lieberstein; Michael N. Meller (57) ABSTRACT

The present invention is directed to a disk drive apparatus in which a disk tray travels forward or backward in a chassis casing to load or unload the disk tray. The chassis casing is constructed with a base chassis 1 and/or cover chassis 2 having openings located in alignment corresponding to the vertical peaks of the disk tray as the disk tray travels through the chassis casing with thin portions provided at the front end of the openings to enclose the openings.

9 Claims, 10 Drawing Sheets

DISK DRIVE APPARATUS

TECHNICAL FIELD

The present invention relates to a disk drive apparatus for driving popular optical data disks such as compact disks (CDs) or digital versatile disks (DVDs).

RELATED ART

Figure 12:
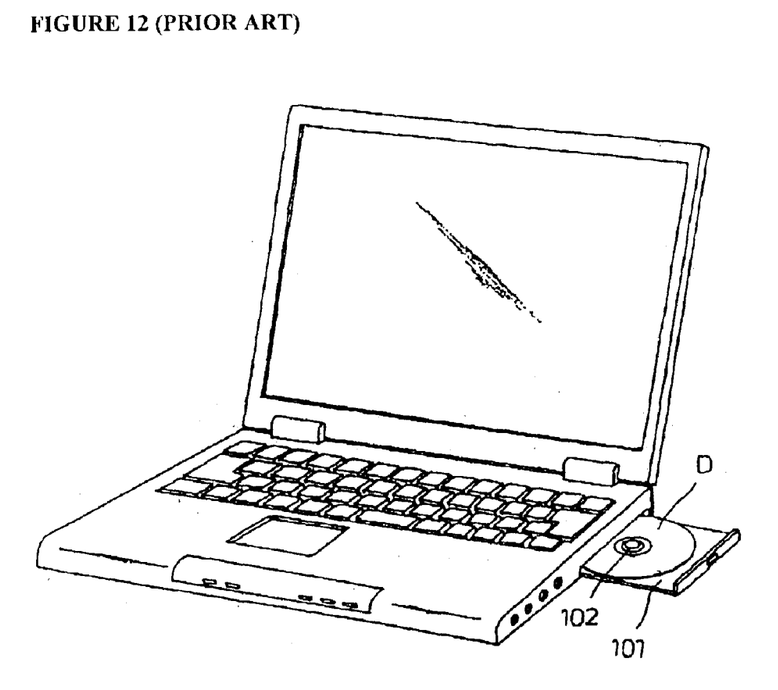
FIG. 12 is a perspective external view of a typical notebook PC.

Generally, terminals represented by personal computers (hereinafter referred to as "PC") have an integrally built in disk drive apparatus that drives an optical disk to record or reproduce data. FIG. 12 illustrates an external view of a typical notebook type PC having a disk apparatus built into the PC. Usually the disk drive apparatus is operated manually from a switch or a command from the PC which causes the disk tray [101] to pop out of the PC. The user then pulls the disk tray [101] further out to place an optical disk D thereon.

Figure 13:
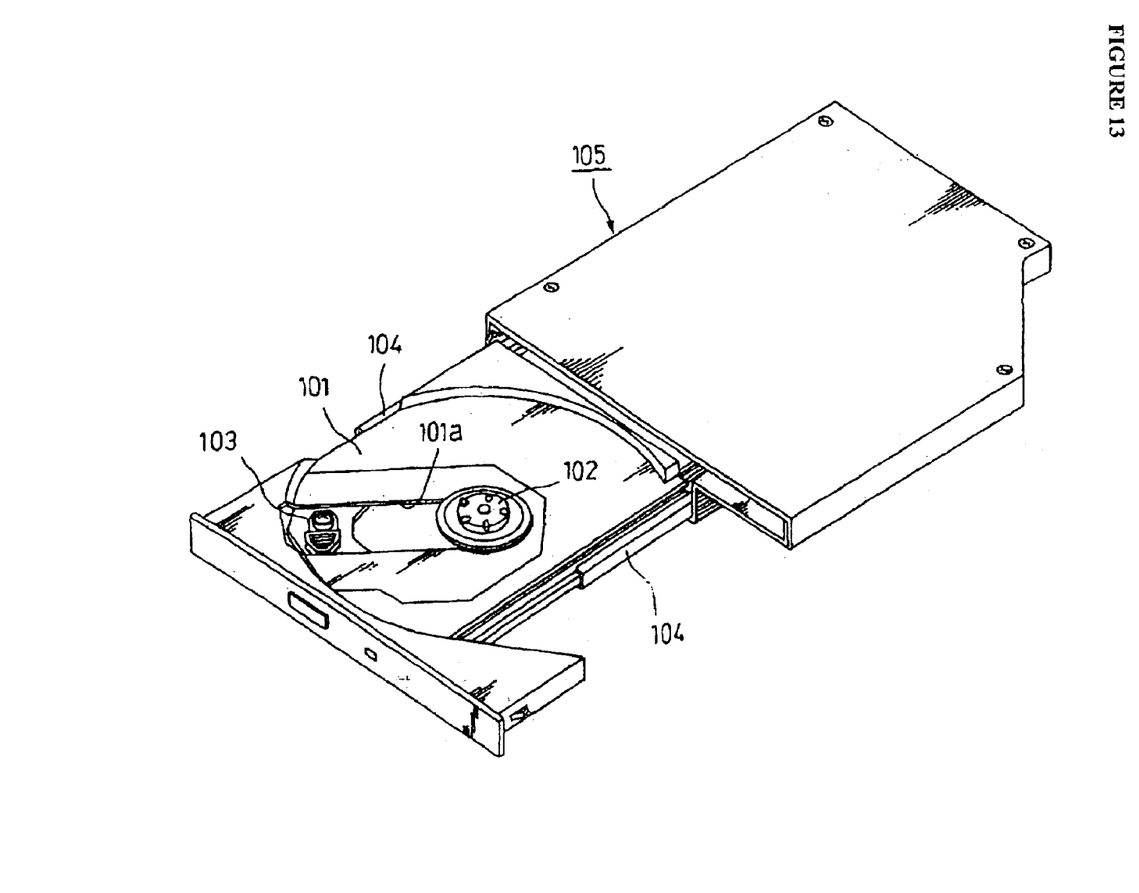
FIG. 13 is a perspective external view of the disk drive apparatus.

FIG. 13 is an external view of a disk drive apparatus particularly for notebook type PCs, which is most widely used. As illustrated in FIG. 13, in the center of the disk apparatus is a turntable 102, which is fixed to a driving shaft of a spindle motor arranged directly below disk tray [101]. Turntable 102 clamps the center hole of an optical disk (D) and transmits a rotational force to the optical disk D in response to operation of the spindle motor. Head unit 103, whose main component is an optical pick up, moves within channel 101a of the disk tray [101] in a radial direction to record and/or reproduce data on the optical disk (D) as it turns. Disk tray [101] is guided by guide rail 104 housed in chassis casing [105].

Figure 14:
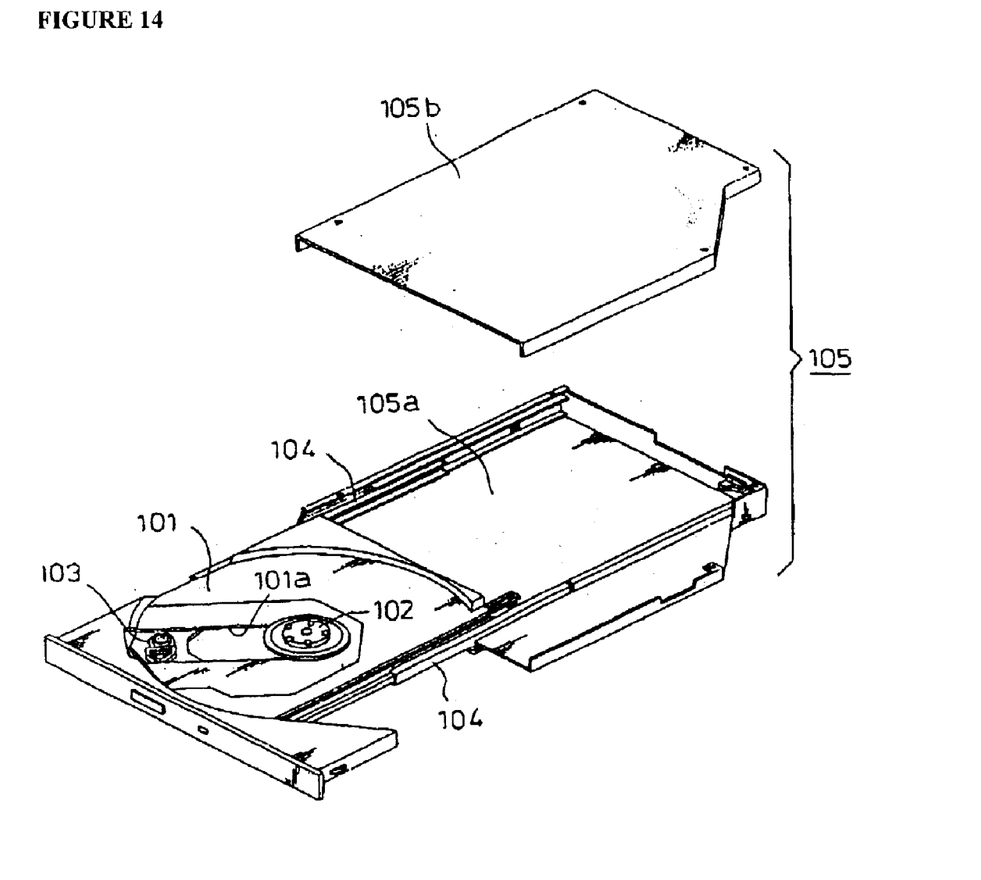
FIG. 14 is a perspective view illustrating the configuration of a chassis casing.

Chassis casing [105] includes a chassis base 105a and a chassis cover 105b constructed as illustrated in FIG. 14 such that the chassis cover 105b covers the cavity formed in the chassis base 105a and that both are preferably screwed together. Disk tray [101] travels back and forth in the space defined between chassis base 105a and chassis cover 105b along guide rail 104. Chassis casing [105] shields the disk from magnetic fields and from static electricity when it completely houses disk tray [101].

Figure 15:
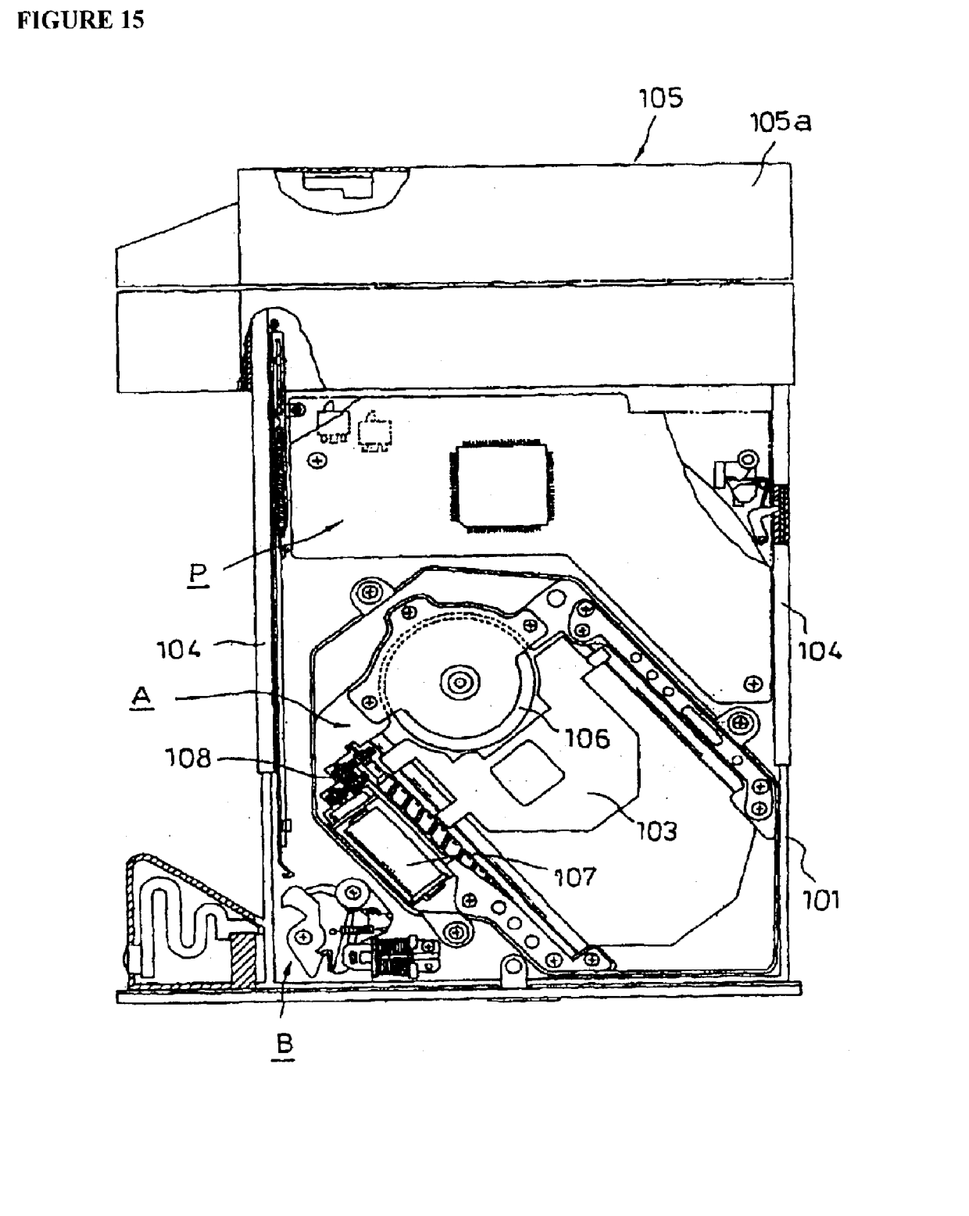
FIG. 15 is a perspective view illustrating the configuration of a disk tray.

FIG. 15 illustrates the inner structure of the disk tray [101]. In the center of the disk tray [101] is shown a spindle motor 106 for rotationally driving an optical disk, a head unit 103 having an optical recording and pick up device (not shown) for recording and reproducing information to and from the optical disk, a drive mechanism (A) having a thread motor 107 for moving head unit 103 in the optical disk's radial direction and a gear unit 108 which represent the major components of the disk tray [101]. At the back end of the drive mechanism (A) is arranged a print circuit board (P) on which electronics components such as semiconductor circuit elements are packaged. The injection or locking mechanism (B) is arranged at a front corner of the disk tray [101].

Figure 16:
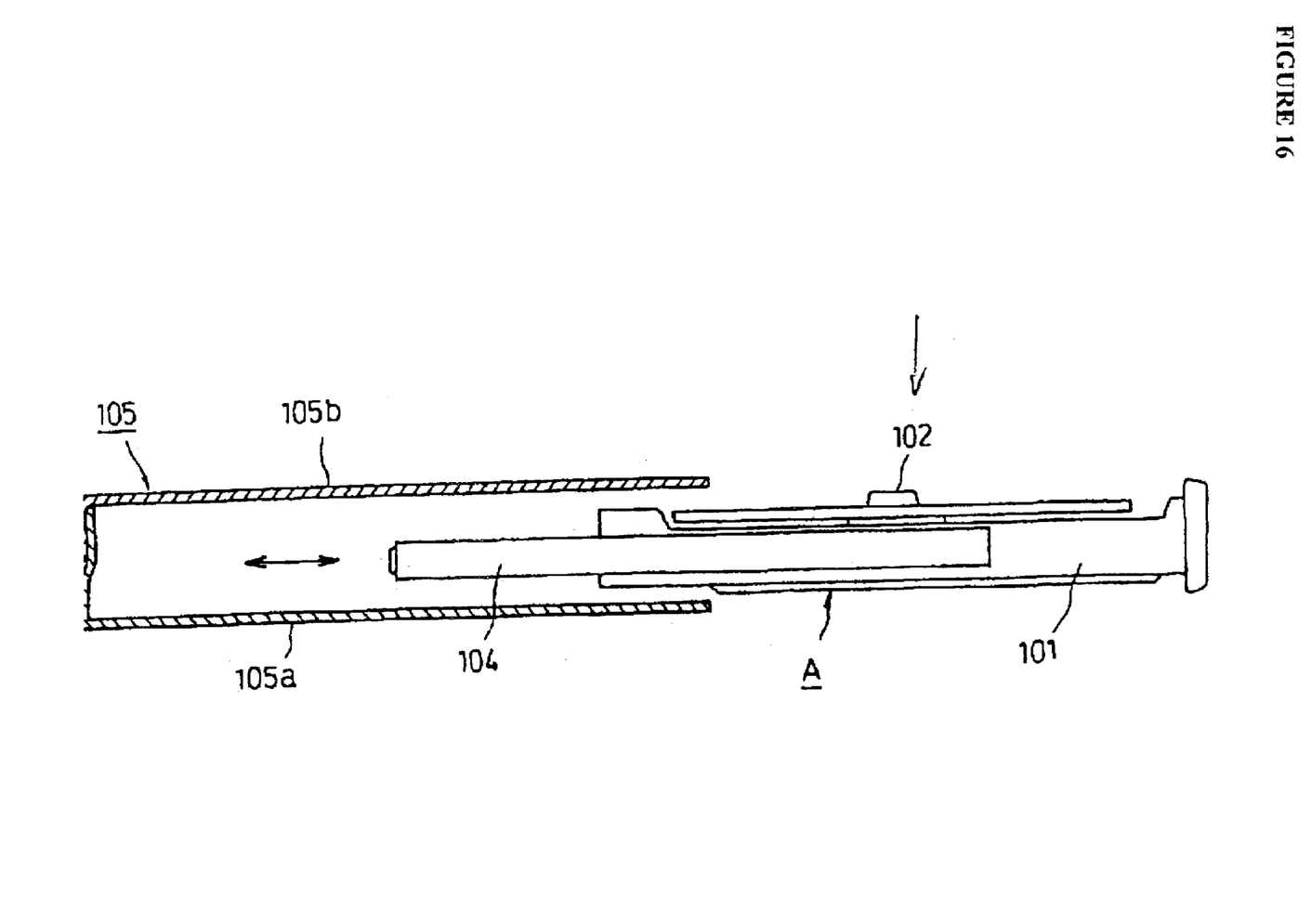
FIG. 16 is a diagram describing the motion of a disk tray in accordance with the present invention.

It is clear that a variety of both electronic components and mechanical components are attached or built into disk tray [101]. It is important to reduce the thickness of the disk tray [101], the turntable 102 and the stick out of the disk tray drive mechanism as illustrated in FIG. 16. For this reason and for the purpose of designing the chassis casing [105] to properly accommodate the disk tray in the disk drive apparatus without interference the vertical height of chassis casing [105] must be limited in distance such that the inner walls of chassis base 105a and chassis cover 105b will not touch the turntable 102 and/or the drive mechanism (A).

Problems to be Solved

Lately, the thinnest and lightest notebook PCs have been growing in demand and to produce the thinnest and lightest PCs have been an essential objective of technical development. A reduction of height is easy for a print circuit board that goes into a main frame or a keyboard for example, however, this is not the case for a disk drive apparatus which includes a drive mechanism to drive an optical disk and a disk tray having a turntable.

In particular the case for the turntable in the drive mechanism requires a minimum height to ensure clamping of an optical disk. Moreover, for many of the drive mechanism components (particularly head unit 103) that comprise multiple minute components, there has been a limit to which the height of each component in the mechanism can be reduced without affecting its performance or reducing its lifetime. The overall thickness of the disk drive apparatus of conventional technology is designed based upon these realistic constraints and a critical thickness for proper design operation has been achieved.

Notwithstanding the above background, it is still possible to select a stainless steel plate having a higher rigidity than a light metal (e.g. aluminum, magnesium) for chassis fabrication, thereby taking advantage of the reduced thickness of such a plate. Nonetheless, when a stainless steel plate is adopted, the weight of the resulting chassis becomes about two times as much as the light metal plate, thereby decreasing the merit of reducing the height of the plate. It is also possible to mold a chassis using a thin light metal, but the resulting chassis provides poor durability and is subject to resonance. Accordingly, these results are not desirable.

The present invention addresses the above limitations of a conventional disk drive apparatus technology to provide a thin-type disk drive apparatus having a chassis casing made of a light metal of a typical thickness in which the height of the entire disk drive apparatus is significantly reduced.

SUMMARY OF THE INVENTION

A disk drive apparatus having a disk tray and a chassis casing with the disk tray adapted for mounting a data storage medium (disk) thereon to move forward or backward within the chassis casing in concert with the disk tray to load or unload the data storage medium, said chassis casing comprising a base chassis and a cover chassis with either chassis or both having an opening therein corresponding in location to the position of the highest vertical peak reached by the disk tray when inserted into the chassis casing and a thin portion which closes off the opening at the front end of the chassis casing through which the disk tray travels, said thin portion having a thickness smaller than the thickness of the wall of the chassis in which the opening is formed.

In the above configuration, the thin portion is formed using a pressing technique or is formed from another member.

DETAILED DESCRIPTION OF THE PREFERRED EMBODIMENT

Figure 1:
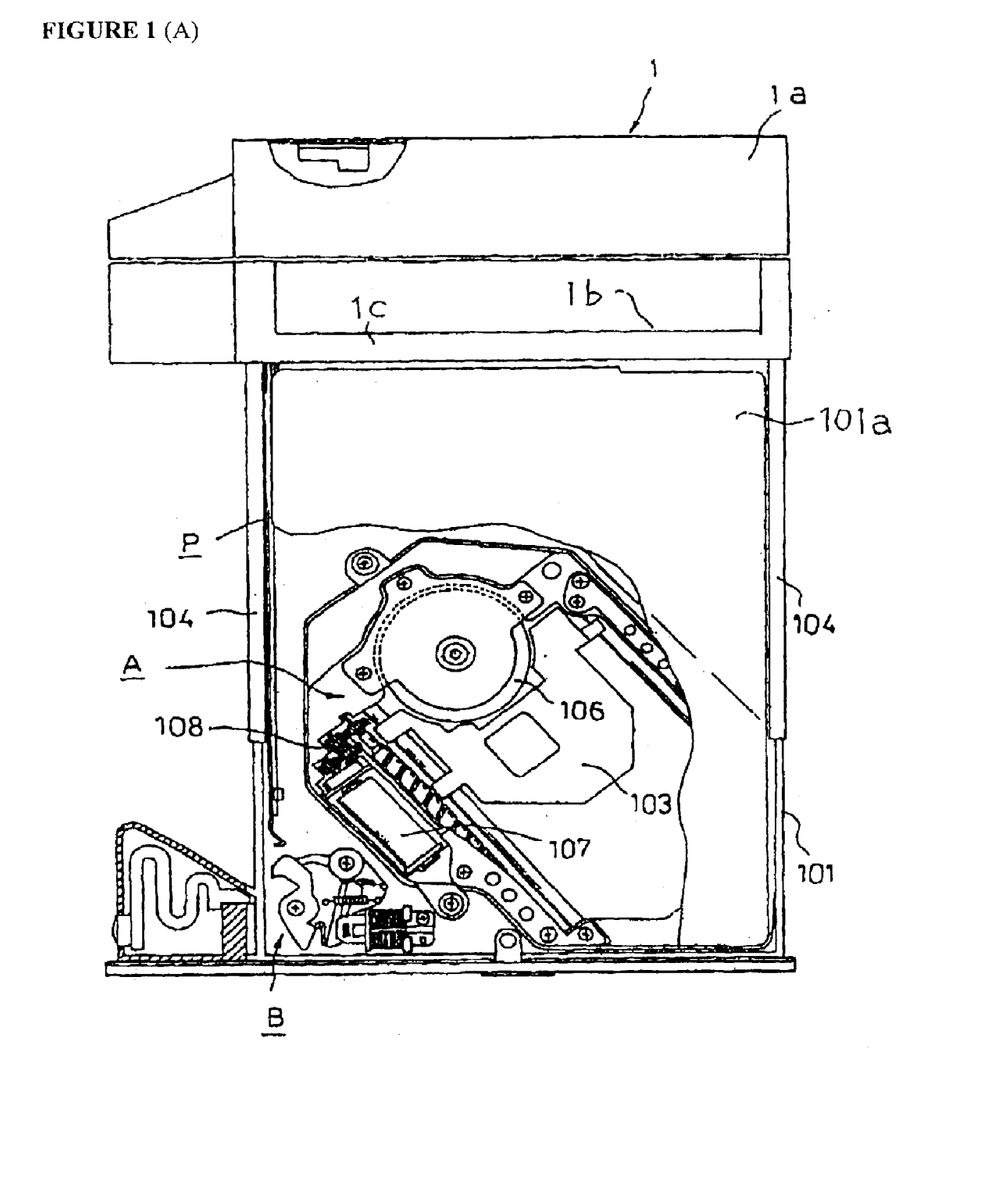
FIG. 1A is a perspective view of the disk drive apparatus of the present invention from its underside or bottom showing the disk tray in its fully extended position pulled out from the chassis casing.
FIG. 1B is a perspective view of the base of the chassis casing of FIG. 1.
Figure 10:
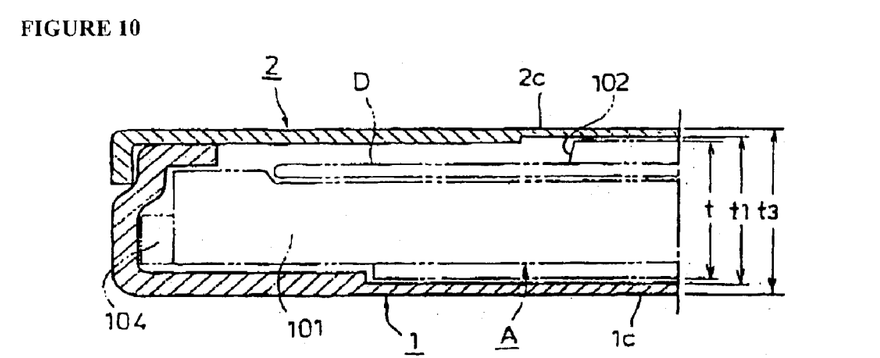
FIG. 10 is a cross sectional view of a section of the disk drive apparatus of the present invention.

FIG. 1(A) illustrates in perspective a bottom view of the disk drive apparatus of the present invention in which disk tray [101] is shown pulled out of chassis casing [105] (shown in FIG. 15) with a part of the shield cover removed to show the internal details of the disk tray [101]. FIG. 1(B) illustrates a preferred construction for the base 1 of the chassis casing [105] of the present invention. Disk tray [101] is configured in the same manner as that of a conventional disk tray. Turntable 102 as shown in FIG. 13 is attached to spindle motor 106 of FIG. 1A and has a height along a vertical axis to form the uppermost peak of the disk tray [101] as it moves through the chassis casing [105] as is apparent from FIG. 10. The lowermost peak of the disk tray [101] is formed by an outthrust portion (not shown) extending downwardly from the head unit [103]. The chassis casing [105] is modified in accordance with the present invention so that the overall height $t_3$ of the chassis casing [105] as shown in FIG. 10 will accommodate either the uppermost peak or the lowermost peak of the disk tray [101] or both thereby minimizing the thickness of the disk tray apparatus without the necessity to increase the overall height $t_3$ of the chassis casing [105].

As shown in FIG. 1B the base 1 of the chassis casing [105] has an opening 1b provided on the bottom plate 1a at a location corresponding to the uppermost peak of the bottom surface or head unit 103 of the disk tray when inserted into the chassis casing [105]. A strip 1c is provided to close off the front end of the opening 1b. The thickness of the strip 1c is thinner than the thickness of the bottom plate 1a of the base chassis's main body.

Note that shield cover 101a is attached to the bottom surface of disk tray [101] in a manner that it covers the entire bottom thereof. Shield cover 101a faces the opening 1b chassis casing [105] which houses the disk tray [101]. Therefore, the opening 1b does not lessen the shielding effect with respect to magnetic fields and static electricity.

Figure 2:
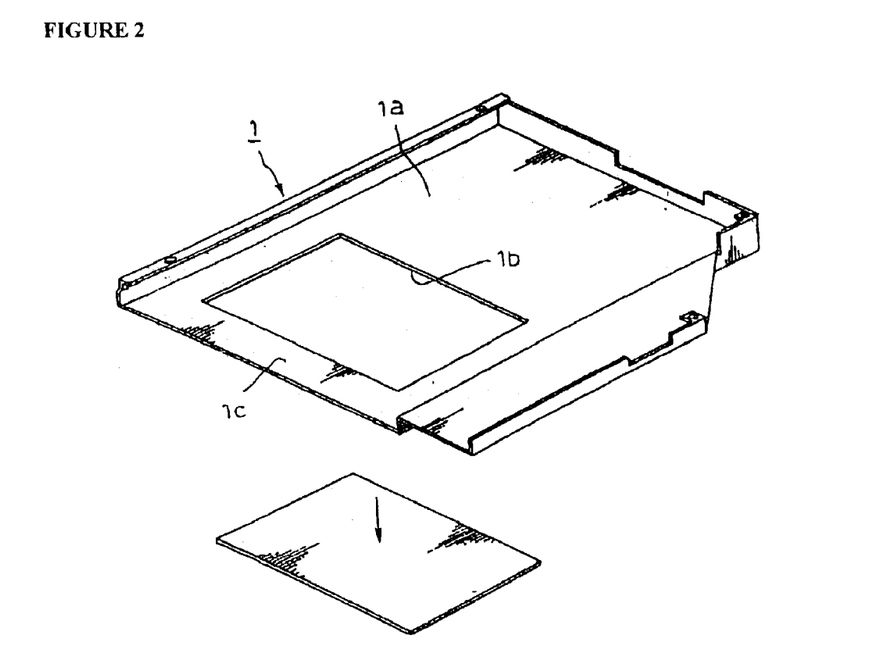
FIG. 2 is another perspective view of the chassis base of FIG. 1B with an open section shown formed as a punch out portion of the chassis base plate.
Figure 3:
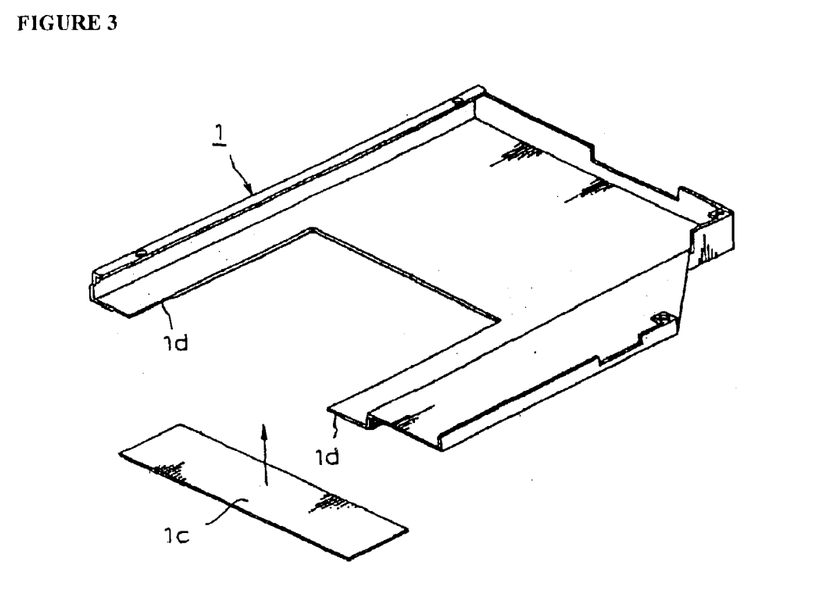
FIG. 3 is yet another perspective view illustrating an alternate chassis base configuration of the present invention using a separate front end strip to close the open section.
Figure 4:
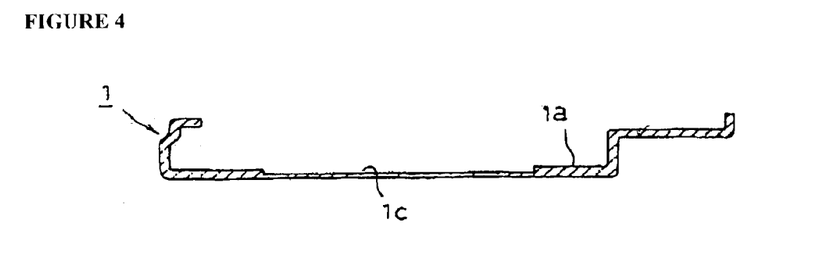
FIG. 4 is a cross sectional view of the chassis base of FIG. 1B.
Figure 5:
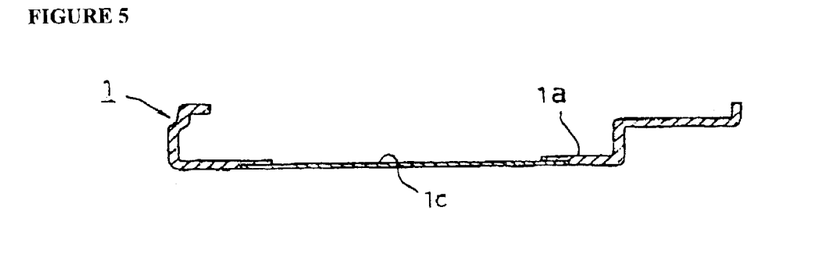
FIG. 5 is a cross sectional view of the chassis base of FIG. 3.

As illustrated in FIG. 2, the opening 1b is punched out from the bottom plate 1a so as to leave a strip portion 1c which closes the front end of the bottom plate 1a facing the disk tray [101]. The height of the strip portion 1c is much thinner than the height of the plate 1a. The strip portion 1c has a cross section illustrated in FIG. 4. In contrast, in the method illustrated in FIG. 3, opening 1b is punched out all the way to form an open end at the front end of bottom plate 1a and another strip portion 1c is attached at the front end of the bottom plate 1a to enclose the opening 1b. The strip 1c may be attached by an appropriate means such as spot welding onto a step portion 1d formed at the front end thereof facing the disk tray [101] adjacent the opening 1b to form an overlap with the step portion 1d. The strip portion 1c has a cross section as illustrated in FIG. 5. In this case, the strip portion 1c may be composed of the same material as that of the base chassis main body or may be of another material having a higher rigidity than that of the base chassis main body. Note that the strip portion 1c may be of a material that deforms less than the press formed strip portion 1c in FIG. 2.

Figure 6:
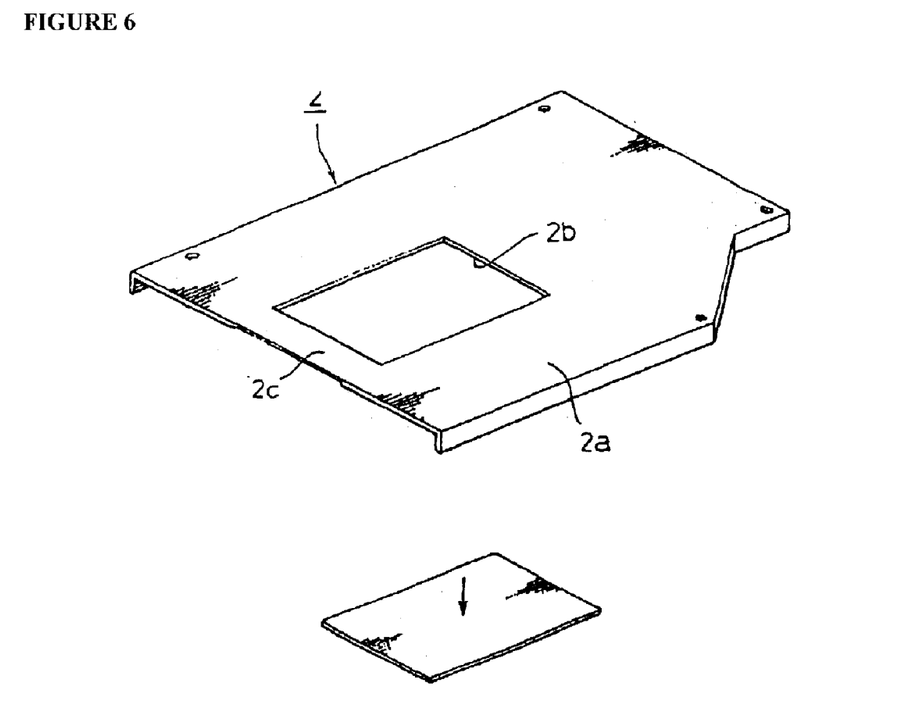
FIG. 6 is a perspective view of the cover of the chassis casing of the present invention showing a portion removed therefrom to form an enclosed opening.

FIG. 6 illustrates a chassis cover 2 for the chassis casing [105] configured according to the present invention and shares a common external shape to that of a conventional chassis cover. Opening 2b is formed on the top plate 2a of the chassis cover 2 at a location which corresponds to the uppermost peak on the surface of the disk tray as it moves into the chassis casing [105]. Opening 2b also has a strip portion 2c at the front end to enclose the opening 2b. The strip portion 2c is thinner than the cover chassis main body thickness and functions to close off the open front end of opening 2b.

Figure 7:
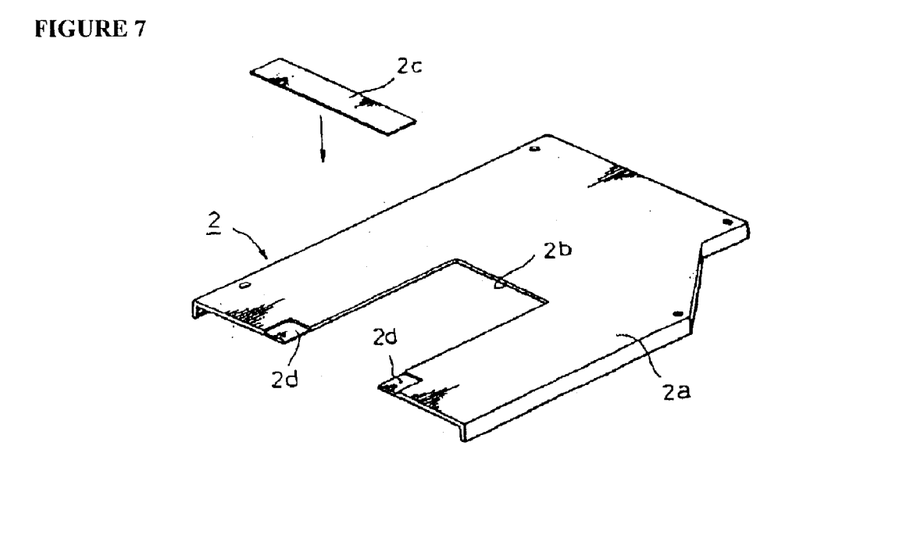
FIG. 7 is another perspective view of the cover of the chassis illustrating an alternate arrangement for forming the chassis cover of the present invention.
Figure 8:
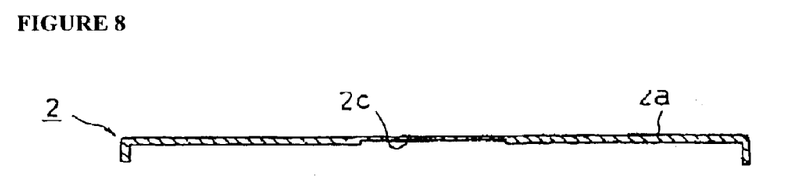
FIG. 8 is a cross sectional view of the chassis cover of FIG. 6.
Figure 9:
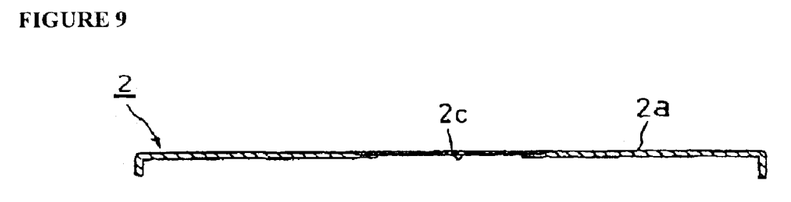
FIG. 9 is a cross sectional view of the chassis cover of FIG. 7.

In a similar manner to the construction of the opening 1b and the strip portion 1c, opening 2b may be punched out of the plate 2a by a press technique, with the front end thereof forming a strip portion 2c which encloses the opening 2b. The strip portion is press formed to reduce its height, i.e., thickness relative to the thickness of plate 2a. The strip portion 2c has a cross section as illustrated in FIG. 8. In contrast, in the method illustrated in FIG. 7, opening 2b is punched all the way through to form an open end and another member 2c inserted by an appropriate means such as spot welding onto a step 2d provided on opposite sides at the front end adjacent the aperture 2b to permit the strip portion 2c to overlap the step 2d. A cross section of the plate 2a at the front end is illustrated in FIG. 9.

It should be understood that the opening 2b formed in the plate 2a of the chassis cover 2 and/or the opening 1b formed in the plate 1a of the base 1 of the chassis casing [105] is formed at respective locations in alignment with the path of travel of the disk tray [101] as it moves through the chassis casing [105] corresponding to the uppermost peak of the disk tray [101] and/or the lowermost peak of the disk tray [101] respectively. Accordingly, either or both the base chassis and/or cover chassis has a plate in which an opening is formed to accommodate the highest peaks in thickness of the disk tray [101].

Figure 11:
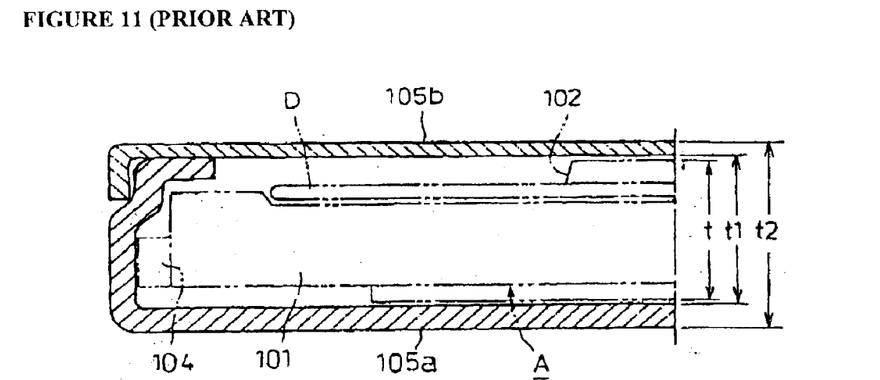
FIG. 11 is a cross sectional view of a section similar to FIG. 10 for a disk drive apparatus of conventional technology.

FIG. 10 is illustrative of the disk drive apparatus of the present invention showing, in cross section, the configuration of the base chassis 1 and the cover chassis 2 of the present invention with the disk tray [101] shown therebetween. This can be compared with FIG. 11 illustrating a disk drive apparatus configuration of the prior art. The result of the comparison is described herein. The components that are common in both the present invention and conventional technology are given the same reference numbers.

In FIG. 11, the upper peak of the disk drive apparatus is established by the turntable 102 and the lower peak by the drive mechanism (A). Accordingly, the maximum thickness or the overall height of the disk drive apparatus is t2 when the thickness of the disk tray [101] is t, and the height between the base chassis 105a and the inner wall of cover chassis 105b that allows the thickness t is t1.

In contrast, as illustrated in FIG. 10, where the disk drive apparatus is constructed with a base chassis 1 and a cover chassis 2 in accordance with the present invention, the height of t1 that allows thickness t is a distance defined by the inner walls of strip portions 1c and 2c between the base chassis 1 and the cover chassis 2, respectively. As a result the maximum height of the disk drive apparatus of the present invention is t3. Based on the result (t2>t3), it is concluded that the disk drive apparatus of the present invention is much thinner in cross section than that of conventional technology. Note that the front ends of opening 1b of base chassis 1 and opening 2b of cover chassis 2 are closed or sealed, thereby enhancing the structural rigidity thereof. In addition, the weight that could have been occupied by the respective openings is eliminated, further reducing the weight of the disk drive apparatus.

As described in detail above, the opening formed in the base chassis 1 and cover chassis 2 are provided at points corresponding to the upper and lower peaks on the disk tray of the base chassis 1 and/or cover chassis 2 and a thin strip is located at the front end of each opening to enclose the opening facing the disk tray. The overall disk drive apparatus can thus have a reduced height and weight at the same time.

What is claimed is:

1. A disk drive apparatus having a disk tray and a chassis casing with the disk tray adapted for mounting a data storage medium thereon to move forward or backward within the chassis casing in concert with the disk tray to load or unload the data storage medium, said chassis casing comprising a base chassis and a cover chassis with either chassis or both having an opening therein in an alignment corresponding to the position of the highest vertical peak(s) reached by the disk tray when inserted into the chassis casing and a thin portion which closes off the opening at the front end of the chassis casing through which the disk tray travels, said thin portion having a thickness smaller than the thickness of the wall of the chassis in which the opening is formed.

2. A disk drive apparatus as defined in claim 1 wherein said opening is formed by a press forming technique.

3. A disk drive apparatus defined in claim 1 wherein said thin portion is formed by a press forming technique.

4. A disk drive apparatus defined in claim 1 wherein said thin portion is a thin strip which is integrally formed when forming the opening.

5. A disk drive apparatus defined in claim 1 wherein said thin portion is a separate member connected to the chassis casing for closing off the opening.

6. A disk drive apparatus as defined in claim 1 wherein said disk tray has a head unit that records and/or reproduces data onto/from said data storage medium.

7. A disk drive apparatus as defined in claim 6 wherein said opening is in an alignment corresponding to the location of said head unit as the disk tray travels through the chassis casing for accommodating the height of said head unit.

8. A disk drive apparatus as defined in claim 1 wherein said either or both the base chassis and/or cover chassis has a plate in which said opening is formed with the plate having step portions upon which said thin portion is affixed in an overlapping relationship.

9. A disk drive apparatus as defined in claim 1 further comprising a shielding cover for said disk tray when said disk tray is housed in said chassis casing with said shielding cover facing said opening.

* * * * *